DATA PROCESSING SYSTEM HAVING A BIDIRECTIONAL STORAGE MEDIUM

Filed April 6, 1966

INVENTORS E. R. KRETZMER
P. MECKLENBURG
D. W. RICE
W. RYAN

BY Lucian C. Canepa
ATTORNEY

United States Patent Office 3,421,149
Patented Jan. 7, 1969

3,421,149

DATA PROCESSING SYSTEM HAVING A BIDIRECTIONAL STORAGE MEDIUM

Ernest R. Kretzmer, Holmdel, Paul Mecklenburg, Fort Lee, Donald W. Rice, Neptune, and William Ryan, Red Bank, N.J., assignors to Bell Telephone Laboratories, Incorporated, New York, N.Y., a corporation of New York Filed Apr. 6, 1966, Ser. No. 540,703
U.S. Cl. 340—172.5 13 Claims
Int. Cl. G11b *13/00*

ABSTRACT OF THE DISCLOSURE

Data sequences are controlled to propagate along a bidirectional storage medium in the forward and reverse directions at relatively low and high speeds, respectively. Low-speed propagation in the forward direction is effective to move the sequences toward an output circuit associated with the arrangement, whereas high-speed reverse propagation is effective to cause one or more of the sequences to be erased. A counter is associated with the medium for counting the number of digits included in a data sequence applied to the medium and for thereby indicating in effect the number of reverse shifts required to clear the medium of a squence that is to be erased. The arrangement also includes early-warning circuitry coupled to the medium for applying a signal derived from a forward propagating sequence to the output circuit just prior to the appearance at the output end of the medium of the first digit of the sequence.

This invention relates to the processing of digital data and more particularly to an improved serial memory arrangement for processing such data.

Shift registers of the so-called domain-wall type are well known in the art, being described, for example, in (1) K. D. Broadbent Patent 2,919,432, issued Dec. 29, 1959 (2) an article by D. H. Smith entitled, "A Magnetic Shift Register Employing Controlled Domain-Wall Motion," which appears in the Institute of Electrical and Electronics Engineers Transactions on Magnetics, vol. MAG–1, No. 4, pages 281–284, Dec. 1965, and (3) R. A. Kaenel application Ser. No. 510,587, filed Nov. 30, 1965, and A. H. Bobeck-R. A Kaenel application Ser. No. 510,523, filed Nov. 30, 1965. Such registers are well suited to perform diverse functions in data processing systems.

In one illustrative data processing system of practical importance, a domain-wall shift register is included in the receiving terminal of an error control system to serve as a buffer memory unit therein. During operation of the terminal, it is occasionally required that data stored in the memory unit be erased. For obvious reasons, it is desired that the erasing operation take place in a minimum period of time and, in addition, that the circuitry required to accomplish the operation be as simple as possible.

Moreover, in some typical shift register arrangements, it is frequently advantageous to include some means for enabling associated output circuitry just immediately prior to the appearance at the output end of the register of the first digit of a stored data sequence. It is, of course, desired that the amount of circuitry required to provide this capability be held to a minimum.

An object of the present invention is an improved data processing system.

More specifically, an object of this invention is an improved shift register arrangement adapted to be included in a data processing system.

Another object of the present invention is an improved shift register of the domian-wall type in which erasure of stored data may be accomplished easily and quickly.

Still another object of this invention is a domain-wall shift register which has the capability of enabling associated output circuitry just immediately prior to the appearance at the output end of the register of the first digit of a stored data sequence.

Yet another object of the present invention is a shift register arrangement characterized by simplicity of design, reliability, high speed and economy of construction.

These and other objects of the present invention are realized in a specific illustrative data processing system embodiment thereof that comprises a shift register of the domain-wall type. A conventional register of this type includes a propagation medium such as, for example, a magnetic wire, in which successive unique regions may be established or nucleated by means of a nucleating coil coupled to the wire, the remainder of the medium remaining in its normal or cleared magnetic state. In this way a binary sequence may be represented in the medium. In turn, the nucleated regions are propagated in a controlled way along the medium to an output region to which a sensing coil is coupled.

The illustrative system is arranged to apply a variable-length multidigit data sequence to the input end of the register. A counter included in the system counts the number of digits included in a particular applied sequence as the sequence is propagated in the forward direction in a step-by-step manner through the register. Propagation in the forward direction occurs at a relatively low speed.

The data sequence applied to the shift register is also, illustratively, applied to an error decoder wherein a determination is made as to whether or not the sequence is error-free. If it is error-free, the sequence stored in the register is subsequently delivered to an output utilization circuit. On the other hand, if the stored data sequence is found to contain errors, the system is adapted to effect erasure of the stored data. This is done by propagating the sequence in the reverse direction through the register. Reverse propagation takes place in a step-by-step manner at a relatively high speed. The reverse-propagated sequence passes through at least one activated biasing or erasing coil coupled to the medium, whereby any nucleated portions in the stored representation are thereby returned to the cleared magnetic state.

During the reverse propagation process the indication of the noted counter is decremented in synchronism with the stepping of digits along the register. In this way the system is selectively controlled to terminate reverse stepping when the counter reaches its zero state. Upon completion of the erasing operation, the system is ready to apply another data sequence to the register.

For reasons that will be set forth later hereinbelow, it is advantageous that associated output circuitry coupled to the sensing coil of the described register be activated just immediately prior to the appearance at the sensing coil of the first digit of a stored sequence. For this purpose, there is coupled to the propagation medium a so-called early-warning coil which is spaced from and intermediate the nucleating and sensing coils. Any signals generated in the early-warning coil are applied to associated early-warning circuitry to cause the aforenoted output circuitry to be enabled just before the first digit of the stored sequence appears at the sensing coil.

It is a feature of the present invention that erasure of data stored in a propagation medium be effected by rapidly reverse shifting the data past at least one erasing coil coupled to the medium.

It is another feature of this invention that a counter be associated with the medium for counting the number of digits included in a data sequence applied to the medium and for thereby indicating in effect the number of reverse shifts required to clear the medium of a sequence that is to be erased.

It is still another feature of the present invention that an early-warning coil be coupled to the medium for applying a signal derived from a propagating data sequence to associated early-warning circuitry to supply an enabling signal to an output circuit just prior to the apparance at the output end of the register of the first digit of the sequence.

A complete understanding of the present invention and of the above and other objects, features and advantages thereof may be gained from a consideration of the following detailed description of an illustrative embodiment thereof presented hereinbelow in connection with the accompanying drawing, in which:

FGI. 1 depicts a specific illustrative data receiving terminal made in accordance with the principles of the present invention;

Figure 1:
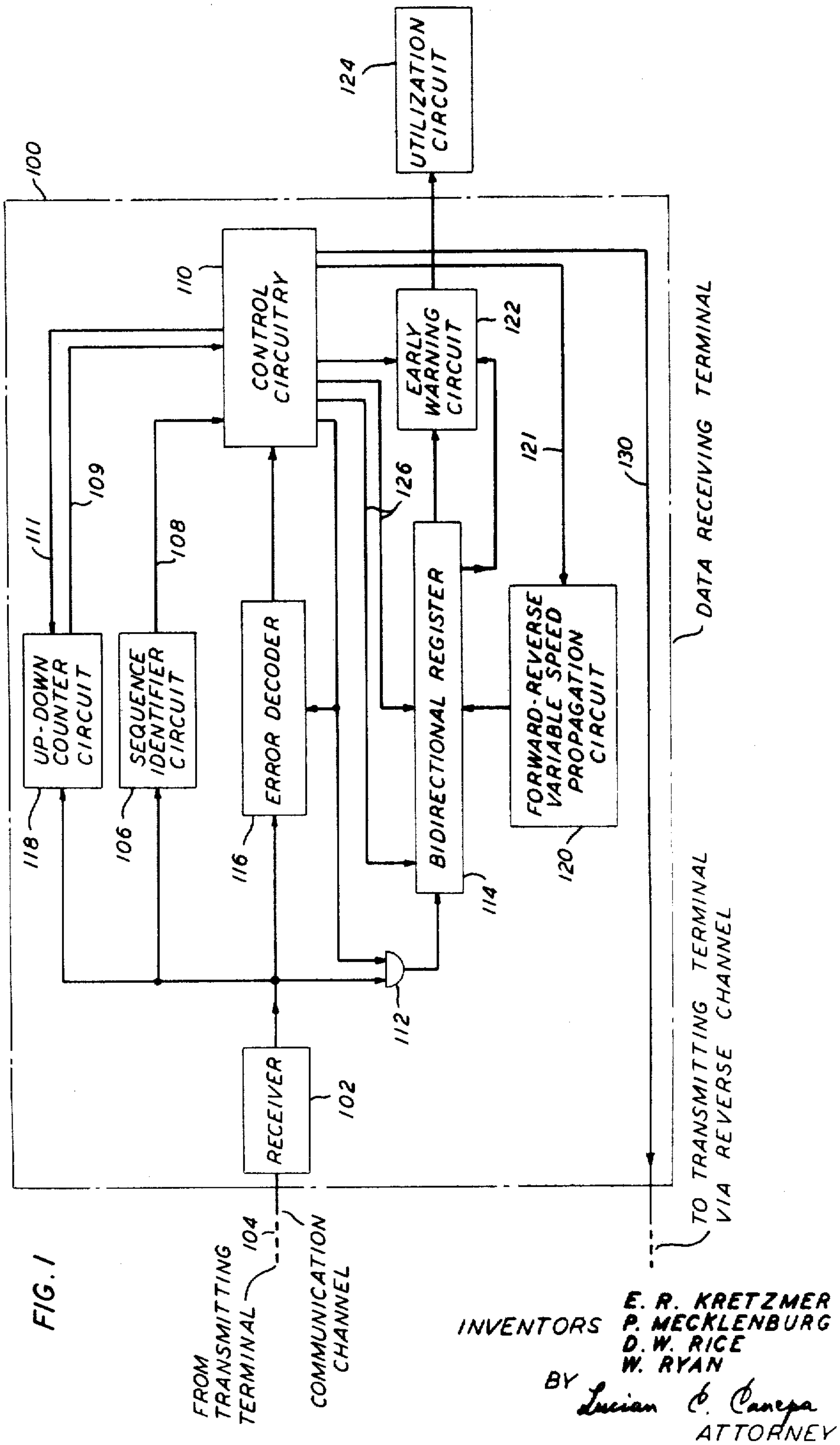

Referring now to FIG. 1 there is shown a specific illustrative data receiving terminal 100 which embodies the principles of the present invention. The terminal 100 includes a conventional receiver 102 for processing signals received from a communication channel 104 and for applying the signals to various components included in the terminal. The output of the receiver 102 comprises sequences or blocks of data digits. Each such sequence includes a variable number of *n*-digit data characters preceded by a start-of-sequence (SOS) signal indication and terminated by an end-of-sequence (EOS) signal indication.

The receipt in the terminal 100 of the initial SOS portion of a received sequence is recognized by a conventional sequence identifier circuit 106. The circuit 106 responds to the occurrence of the SOS indication by supplying an initiating signal via a lead 108 to control circuitry 110. In response to this signal, the circuitry 110 enables a gate 112, whereby the *n*-digit characters intermediate the SOS and EOS indications are applied in serial form to the input end of a bidirectional register 114.

The enabling signal supplied by the circuitry 110 to the gate 112 is also effective to enable an error decoder 116 to commence processing of the received *n*-digit characters to determine whether or not any errors occurred therein during transmission over the channel 104. This processing takes place in a known manner in accordance with whatever particular error detection code is embodied in the received data sequences.

An up-down counter circuit 118 is also enabled by the control circuitry 110 in response to the receipt of an SOS indication to initiate the counting of the total number of digits included in the *n*-digit characters of a particular sequence applied to the register 114. At the same time, a forward-reverse variable speed propagation circuit 120 is activated by the circuitry 110 to initiate propagation of the data input signals applied to the register 114 from the gate 112. This propagation is accomplished in the register 114 in a step-by-step fashion in the forward (left-to-right) direction at a relatively low rate.

If the error decoder 116 determines that a particular data sequence applied to the bidirectional register 114 is error-free, the sequence continues to be propagated in the forward direction until eventually, with the aid of an early-warning circuit 122 (to be described in detail below), the sequence is delivered to a utilization circuit 124.

Upon receipt in the terminal 100 of FIG. 1 of an EOS signal, the control circuitry 110 is signaled by the sequence identifier circuit 106 to reset the up-down counter circuit 118 and to disable the gate 112 and the error decoder 116. However, the propagation circuit 120 remains activated by the circuitry 110 until the entire above-assumed error-free data sequence stored in the register 114 has been delivered to the utilization circuit 124.

If desired, appropriate buffering arrangements may be provided associated with the receiver 102 for insuring that the EOS signal is not actually applied to the register 114.

If the decoder 116 shown in FIG. 1 determines that the data sequence applied to the register 114 contains errors therein, a so-called erasing cycle of operation is initiated in the depicted receiving terminal 100. In this cycle the control circuitry 110 applies signals via a lead 121 to the propagation circuit 120 to switch the circuit 120 a high-speed reverse-propagation mode of operation. At the same time, the circuitry 110 applies biasing signals via leads 126 to at least one coil coupled to the propagation medium of the register 114. These signals are of the proper polarity to erase any stored data representations that are propagated through the noted coils. In this way, and as will be more apparent from the description below of FIG. 2, any data digits stored in the register 114 are erased in a high-speed fashion.

The number of reverse shifts required to erase an erroneous data sequence stored in the register 114 is indicated by the counter circuit 118. As mentioned above, the counter circuit 118 is incremented during forward shifting of the register 114. Hence the count thereof is representative of the number of data digits stored in the register 114. Thus, down-counting of the circuit 118 in synchronism with reverse shifting of the register 114 is effective to indicate to the control circuitry 110 when a sufficient number of reverse shifts has occurred to completely erase the erroneous sequence.

The indication of the counter circuit 118 is communicated to the control circuitry 110 via a lead 109, whereas down-counting of the circuit 118 is controlled by signals applied thereto from the circuitry 110 via a lead 111 during the reverse-shifting mode of operation. If desired, the control circuitry 110 may be adapted to respond to an error-present indication from the decoder 116 to apply a retransmission request signal to a lead 130. In turn, this signal may be sent via a reverse channel to an associated transmitting terminal wherein a retransmission of the erroneously-received sequence would take place.

Figure 2:
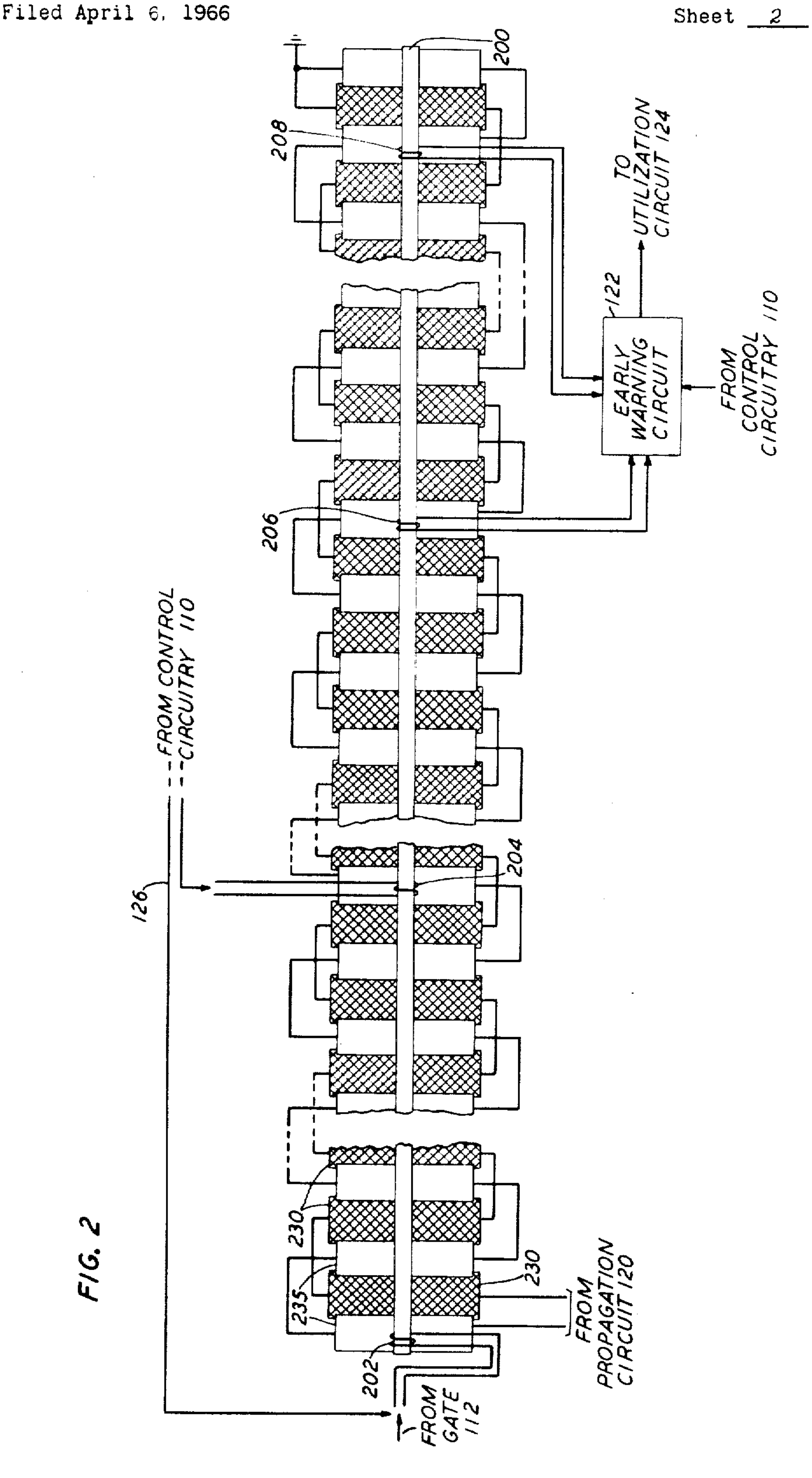
FIG. 2 is a detailed showing of a portion of a shift register arrangement suitable for inclusion in the terminal of FIG. 1.

Advantageously, the bidirectional register 114 shown in FIG. 1 comprises a domain-wall shift register arrangement. An illustrative such register is depicted in FIG. 2. The specific arrangement shown in FIG. 2 includes a propagation medium which for illustrative purposes is assumed to be a continuous length of wire 200 made of a suitable square-loop magnetic material. (One particularly suitable material therefor is described in a copending application of D. H. Smith and E. M. Tolman, Ser. No. 458,140, filed May 24, 1964, now Patent 3,365,290, issued Jan. 23, 1968.) More generally, the medium is of a material characterized by the ability to maintain a reverse (magnetized) domain therein in response to a first magnetic field in excess of a nucleation threshold and the ability to move that domain therealong in response to a second field in excess of a propagation threshold and less than the nucleation threshold.

Coupled to the wire 200 of FIG. 2 is a nucleating or input coil 202 which receives data input signals from the gate 112 (FIG. 1) during the forward-shift mode of operation. During the reverse-shift mode of operation, the coil 202 has applied thereto an erasing signal from the control circuitry 110.

As mentioned above, the register 114 includes at least one erasing coil. As noted, the input coil 202 shown in FIG. 2 functions as an erasing coil during the high-speed erasing operation. Therefore, no other erasing coil need be included in the FIG. 2 arrangement. However, for illustrative purposes the specific arrangement depicted in FIG. 2 is shown as including an additional erasing coil 204 which is positioned at the midpoint of the depicted shift register. As explained below, this additional erasing coil facilitates the erasing operation.

Also coupled to the wire 200 is an early-warning coil or winding 206 and a sensing or output coil 208. The interrelationship between these coils and the early-warning circuit 122 will be set forth below in connection with the description of FIG. 3.

Input representations that are established by the nucleating coil 202 in the shift register arrangement of FIG. 2 may be shifted or propagated along the medium 200 by means of a conventional array of two interconnected and overlapping sets of strap members. As shown in FIG. 2 the wire 200 overlays both sets of strap members. One set of strap members comprises a plurality of rectangular straps 230 which are shown cross-hatched in FIG. 2. The straps 230 are electrically interconnected to form a series circuit one end of which is grounded and the other end of which is connected to the propagation circuit 120. The other set of strap members comprises a plurality of rectangular straps 235 which are also electrically interconnected to form a series circuit connected between ground and the circuit 120.

In response to signals applied thereto from the control circuitry 110, the propagation circuit 120 is adapted to apply 4-phase propagating signals of a well-known form to the noted sets of straps. As a result of such propagating signals, input representations stored in the medium 200 are shifted therealong in a step-by-step fashion. Forward propagation of stored representations results from applying to the straps 230 and 235 a conventional 4-phase sequence of the type described in the aforecited Smith article. In accordance with the principles of this invention, the frequency of the forward-propagation 4-phase signals is selected to be relatively low.

Reverse propagation of signals stored in the medium 200 of FIG. 2 results from modifying the aforementioned 4-phase sequence in a straightforward and well-known manner. A particular propagation sequence suitable for this purpose is specifically described in the aforementioned Bobeck-Kaenel application. In accordance with one aspect of the principles of the present invention, the frequency of these reverse-propagation signals is selected to be relatively high, whereby erasure of a particular stored sequence is effected in a time that is substantially less than the time required to move the sequence into storage in the register 114.

As indicated above, the erasure operation is facilitated by including more than one erasing coil on the medium 200 shown in FIG. 2. Thus, the specific illustrative embodiment of FIG. 2 includes two erasing coils 202 and 204. Because of the aforementioned midpoint positioning of the coil 204, it is sufficient to reverse-shift the register 114 a maximum of C steps or digit positions, where 2C is the storage capacity in digits of the register 114. Thus, if the circuit 118 registers a count of C or less, said $C-4$, only $C-4$ reverse shifts are necessary to effect erasure of the stored sequence, with the erasing coil 202 effecting the erasure of $C-4$ digits. On the other hand, if the circuit 118 registers a counter greater than C, say $C+7$, only C reverse shifts are required to accomplish the desired erasure, with the erasing coil 204 effecting the erasure of 7 digits and the erasing coil 202 effecting the erasure of C digits.

For illustrative purposes, the initial or cleared state of the medium 200 of FIG. 2 is assumed to be the right-to-left magnetization condition thereof. In other words, the initial magnetic condition of the wire 200 can be represented by a horizontal arrow (not shown) pointing to the left. Illustratively, this magnetic condition is assumed to represent the binary "0" state. Assume then that the gate 112 applies to the nucleating coil 202 an input signal of the proper polarity to establish a reverse or left-to-right stable magnetic condition or domain in the wire portion coupled thereto. This reverse or unique domain is representative of a "1" signal. Thereafter other "0" or "1" data signals may be applied in serial form to the coil 202. In response to the application of a "0" data signal to the coil 202, no reverse domain is established in the wire 200 associated therewith. But in response to a "1" data signal, a reverse domain is created in the wire 200. In turn, these "0" and "1" signal representations are propagated in sequence along the medium 200 by signals applied to the straps 230 and 235 by the propagation circuit 120.

The data sequences applied to the medium 200 of FIG. 2 include a variable number of characters, each character being $n$ digits in length and including at least one "1" signal. To process such variable-length sequences in an efficient manner, it is advantageous that output circuitry associated with the register 114 of FIG. 1 be activated just immediately prior to the appearance at the output winding 208 (FIG. 2) of the first digit of a propagating data sequence. Such activation at that particular time is advantageous for synchronization purposes and to avoid undesired spacing or stepping of associated auxiliary equipment such as teletypewriters.

The early-warning winding 206 shown in FIG. 2 functions, in combination with the early-warning circuit 122, to activate the output circuitry of the illustrative system at the desired time. In addition, this combination is effective to supply a priming signal to auxiliary equipment such as teletypewriters and magnetic drums to initiate the warm-up operation of such equipment prior to the application thereto of an output data sequence. Such a warm-up period permits the auxiliary equipment to attain a particular desired operating condition such as position or speed.

Assume that a data sequence comprising two 4-digit characters has been applied to the register 114 (FIG. 1). Assume further that the storage capacity (2C) of the register 114 is 40 digits. Consequently, the counter circuit 118, in the particular assumed case, would indicate a total count of 8 (digits). The detection by the decoder 116 of an error in this stored sequence results in the initiation in the system of an erasing cycle of operation. Such a cycle involves high-speed reverse shifting of the stored 8-digit sequence with concurrent energization of the erasing coil 202 and synchronous down-counting of the circuit 118. After 8 such shifts, the stored sequence will have been erased by the action of the energized coil 202 on the 8 digits propagated therethrough. (The action of energized biasing coils in erasing stored information propagated therethrough is described in detail in a copending application of P. Mecklenburg and L. H. Young, Ser. No. 533,155, filed Mar. 10, 1966.) In this way, the register 114 is returned to its initial or cleared condition in a high-speed manner, ready to have another data sequence applied thereto.

Assume that another data sequence comprising two 4-digit characters is stored in the register 114 and determined by the decoder 116 to be error-free. As a result, this sequence continues, under the control of the circuitry 110 and the propagation circuit 120, to be propagated in the forward direction through the register 114. The action of the early-warning coil 206 and the early-warning circuit 122 in responding to this sequence to selectively activate the output circuitry of the system will be apparent from the description below.

Figure 4:
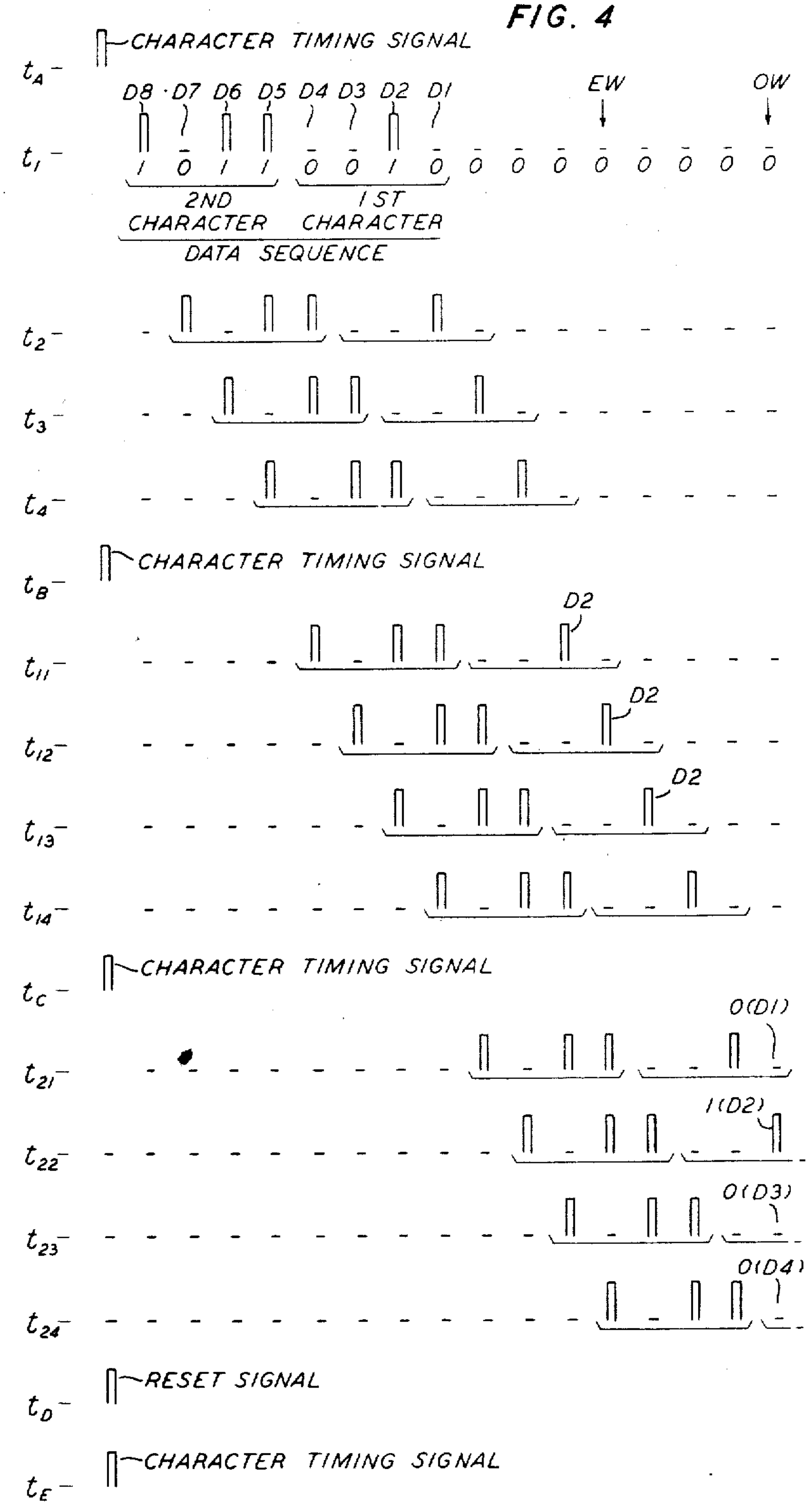
FIG. 4 is a timing diagram that is helful in understandinf the mode of operation of the early-warning circuit shown in FIG. 3.

The progression of the assumed two 4-digit characters along the medium 200 of FIG. 2 is partially represented by the diagram of FIG. 4. This representation starts at the point at which the stored data sequence is approaching the early-warning coil 206. Also shown in FIG. 4 are regularly-occurring character timing signals and a reset signal supplied by the control circuitry 110. Specifically, FIG. 4 indicates that a character timing signal is supplied at time $t_A$. Thereafter, at time $t_1$, the 8-digit data sequence is depicted as being stored in the medium 200 with its first or right-most digit D1 being spaced by 4 digit positions from the location of the early-warning coil 206, which is represented by an arrow labeled EW.

The arrow labeled OW in FIG. 4 represents the position of the output coil 208 of FIG. 2. Illustratively, the coil 208 is shown displaced by 4 digit positions or shifts to the right of the early-warning coil 206. The "0" digits indicated as being stored to the right of the herein-considered 8-digit data sequence (see, for example, the depiction in FIG. 4 at time $t_1$) are representative of the fact that that portion of the medium 200 is in its initial or cleared magnetic state.

Subsequent to the time $t_1$ shown in FIG. 4, the stored data sequence is forward shifted to the right in the medium 200 by one digit position. The resultant position of the data sequence and of the preceding "0" representations is indicated in the row designated $t_2$. The noted shift causes a "0" representation to be propagated through the early-warning coil 206, whereby no setting signal is applied from the coil 206 to the set or S terminal of a normally-reset flip-flop 302 included in the early-warning circuit 122 shown in FIG. 3. Accordingly, at this point in the operation of the system, no priming or warm-up signal is applied by the flip-flop 302 via a lead 304 to associated equipment. Nor is a gate 306 in FIG. 3 enabled by the flip-flop 302 to pass any subsequent character timing signal to a second flip-flop 308 which is also normally in its reset state. As a result, an output gate 310 is not enabled by the flip-flop 308, whereby "0" signals that propagate through the output winding 208 are not applied via the gate 310 to the utilization circuit 124. Nor is a gate 311 enabled to pass digit timing signals derived from the control circuitry 110 to the circuit 124. (Alternatively, appropriate digit timing signals may be derived directly from the output data signals themselves.)

Figure 3:
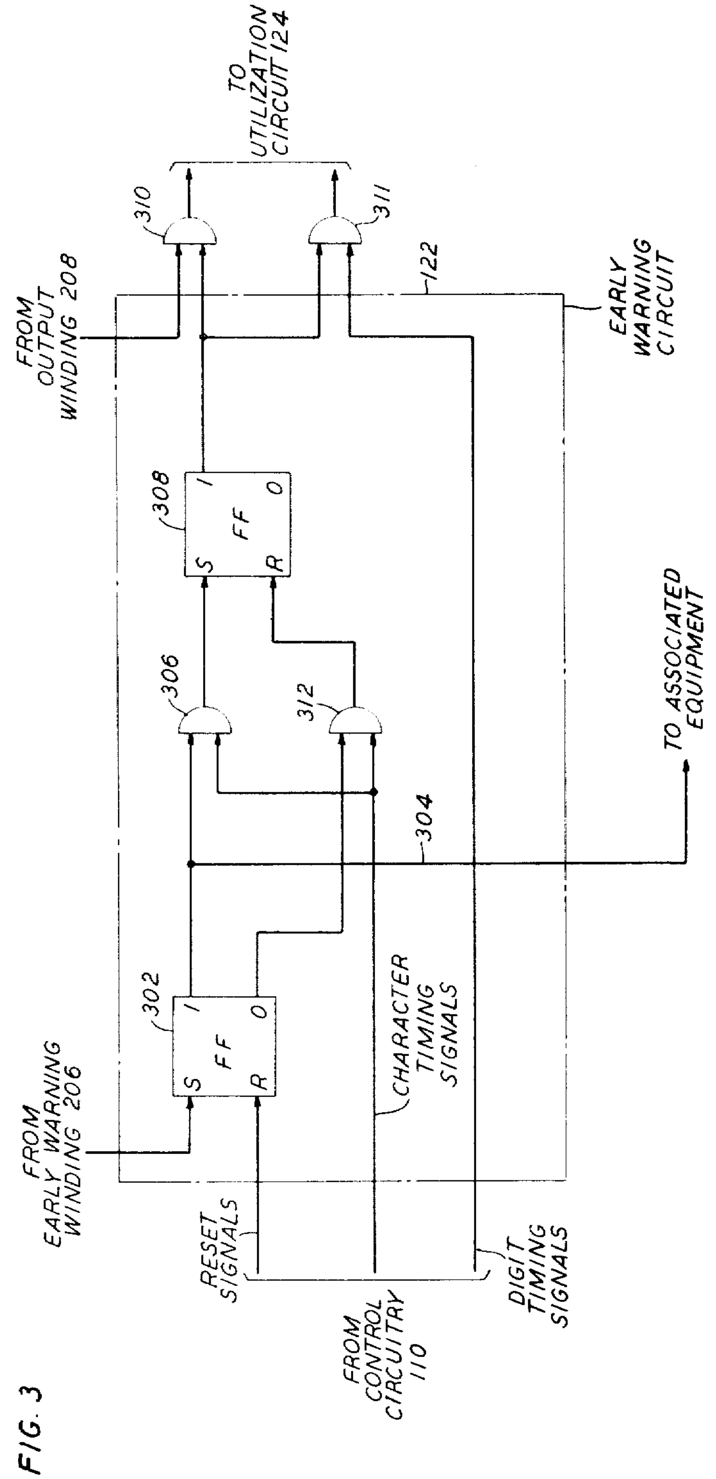
FIG. 3 is a schematic diagram of an illustrative early-warning circuit adapted to be combined with the shift register arrangement in the FIG. 1 terminal.

Two additional digit-by-digit shifts of the data sequence stored in the register 114 produce no change in the condition of the aforedescribed early-warning circuit shown in FIG. 3. The respective positions of the assumed sequence in the medium 200 subsequent to these two shifts is represented in FIG. 4 in the rows marked $t_3$ and $t_4$. Next, at time $t_B$ another character timing signal occurs. Since the gate 306 of FIG. 3 is still disabled, this timing signal is not passed through the gate 306 to set the flip-flop 308. Hence the output gates 310 and 311 remain in their disabled or blocking condition and no signals are delivered to the utilization circuit 124.

Finally, during the shift that steps the stored sequence to the position represented in line $t_{12}$ of FIG. 4, a "1" indication (specifically the data digit D2) is propagated through the early-warning winding 206. In response thereto a signal is generated in the winding 206 to set the flip-flop 302 of FIG. 3 to its "1" state. At this time a priming or early-warning signal is applied from the flip-flop 302 via the lead 304 to associated equipment. This signal can be utilized for various different purposes, for example to initiate the rotation of magnetic drum storage units or to turn on auxiliary teletypewriters.

The switching of the flip-flop 302 to its "1" state is also effective to enable the gate 306. Accordingly, the next character timing signal, which occurs at time $t_C$, is passed through the gate 306 to set the flip-flop 308 to its "1" state, whereby the output gates 310 and 311 are thereby enabled. As a result, the data signals that are thereafter generated in the output winding 208 are passed (together with their associated digit timing signals) through the enabled gates 310 and 311 to the utilization circuit 124. The first four such data signals are respectively indicated in lines $t_{21}$ through $t_{24}$ of FIG. 4. These four signals comprise the first 4-digit character of the data sequence stored in the register 114.

In an exactly similar manner (not represented in FIG. 4) the four signals of the second character of the stored data sequence are subsequently delivered to the utilization circuit 124. Then, at time $t_D$ (FIG. 4) the control circuitry 110 applies a reset signal to the flip-flop 302 of FIG. 3. In turn, this causes the gate 306 to be disabled and an associated gate 312 to be enabled. As a result, the next character timing signal (at time $t_E$) is passed through the gate 312 to reset the flip-flop 308, whereby the output gates 310 and 311 are disabled and subsequent signals propagated through the output winding 208 (and their associated digit timing signals) are not delivered to the utilization circuit 124.

In the specific case assumed above, a counter or similar circuit is included in the control circuitry 110 to aid in the derivation of a reset signal at time $t_D$. If more than a single data sequence is to be stored in the register 114, multiple such counter circuits would be required. Hence it may be advantageous to derive a reset signal at the end of each character. Each such reset signal would be preceded by an associated character timing signal. In this way the contents of the flip-flop 302 is transferred to the flip-flop 308 prior to the resetting of the unit 302. Such an alternative timing format eliminates the need for a timing signal occurring at $t_D$.

The output gates 310 and 311 remain in their disabled or quiescent states until the first character of a subsequent data sequence is propagated along the register 114 and past the early-warning winding 206. In accordance with the mode of operation described above, the presence of a "1" signal in any digit position of that first character is effective to activate the early-warning circuit 122 and to thereby enable the output gates 310 and 311 just prior to the appearance at the output winding 208 of the first digit of the first character of the subsequent sequence.

In summary, there has been described herein in detail a novel data processing system that includes a unique shift register arrangement in which erasure of stored data is effected by rapid reverse shifting of the data past at least one erasing element. A counter is associated with the register for counting the number of digits included in a data sequence applied to the register, thereby indicating in effect the number of reverse shifts required to clear the medium of a sequence that is to be erased. In addition, an early-warning element is coupled to the register for applying a signal derived from a propagated data sequence to associated early-warning circuitry to supply an enabling signal to an output circuit of the system just prior to the apparence at the output end of the register of the first digit of the sequence.

It is to be understood that the above-described arrangements are only illustrative of the application of the principles of the present invention. In accordance with these principles numerous other arrangements may be devised by those skilled in the art without departing from the spirit and scope of this invention. For example, if the priming or advance warning signal appearing on the lead 304 of FIG. 3 does not occur sufficiently in advance of the appearance of signals at the output winding 208, the early-warning winding 206 may simply be positioned farther to the left on the medium 200 of FIG. 2. Also, as indicated above, the erasing operation described in detail herein may be further facilitated by including additional erasing coils on the medium 200.

Although primary emphasis herein has been directed to the case wherein a single sequence is processed by the system shown in FIG. 1, it is to be understood that the system is adapted to process a series array comprising a plurality of variable-length sequences. In such a case, the above-described early-warning circuitry is particularly advantageous in that it considerably simplifies the capability that would otherwise have to be embodied in the control circuitry 110 to keep track of plural sequences in the register 114. In the case of plural stored sequences, it is apparent that care must be taken to position and activate the associated erasing coils in a manner so as not to inadvertently erase correct data digits stored in the register 114 when the digits of an incorrect sequence are being erased therein by the noted reverse shifting technique. One obvious safeguard to take is to activate only one erasing coil (specifically the left-most one shown in FIG. 2) whenever the erasure operation is carried out.

It is noted that reverse shifting accompanied by erasure, as described above, is especially advantageous when plural data sequences are being processed. To erase one particular sequence in some other fashion, for example by continued forward shifting and recirculation of only the sequences to be preserved, is generally considerably more difficult to accomplish.

Many other apparent changes and modifications may be made in the specific illustrative above-described arrangements. For example, under some circumstances, it may be advantageous to effect erasure by reverse propagation at the same or even at a lower rate than that characteristic of forward propagation. Also, the principles of the invention are not limited to domain-wall shift registers. The concept of erase "taps" is useful in other contexts, for example to reduce the number of reset terminals in a compact miniaturized transistor shift register arrangement that is pin limited. In addition, for transistor shift registers, the problem of otherwise identifying those stages to be reset still exists. In accordance with the invention this problem is solved in an efficient manner. Still further, it is noted that the principles of the present invention are not limited to a shift register configuration. A reversible serial memory such as a suitable delay line may obviously be substituted therefor.

What is claimed is:

1. In combination in a data processing system,
a serial memory including an input,
first means for applying a serial data train including at least one variable-length multidigit data sequence to said input,
second means for propagating said sequence(s) in a forward direction through said memory,
third means responsive to said applying means for indicating the length of the sequence that was most recently applied to said memory,
fourth means responsive to the most-recently-applied sequence exhibiting predetermined characteristics for propagating said sequence in a reverse direction through said memory to effect erasure of said sequence,
and fifth means connected to said indicating means for decreasing the indication thereof during reverse propagating and for terminating the operation of said reverse propagating means in response to the occurrence of an initial condition in said indicating means.

2. A combination as in claim 1 wherein said serial memory comprises a shift register.

3. A combination as in claim 2 wherein said second means is adapted to propagate sequences in the forward direction at a relatively low speed.

4. A combination as in claim 3 wherein said third means comprises an up-down counter circuit.

5. A combination as in claim 4 wherein said fourth means is adapted to propagate sequences in the reverse direction at a relatively high speed.

6. A combination as in claim 5 wherein said shift register comprises a domain-wall arrangement including a propagation medium having input and output ends,
said arrangement further including a nucleating coil coupled to said medium adjacent the input end thereof.

7. A combination as in claim 6 wherein said reverse propagating and erasing means includes at least one erasing coil coupled to said medium,
and means connected to said erasing coil(s) for applying thereto a biasing signal of a polarity to switch any "1" signal representation propagated therethrough to a "0" representation.

8. A combination as in claim 7 further including an output coil coupled to said medium adjacent the output end thereof,
and further including an early-warning coil coupled to said medium intermediate and spaced from said nucleating and output coils.

9. A combination as in claim 8 further including an early-warning circuit connected to said early-warning and output coils for enabling an associated output circuit just prior to the propagation through said output coil of the first digit of a stored sequence,
whereby signals generated in said output coil subsequent to said enabling action are passed through said output circuit to a utilization circuit.

10. A combination as in claim 9 wherein said early-warning circuit comprises a first flip-flop having a set terminal connected to said early-warning coil,
a second flip-flop,
a first gate responsive to said first flip-flop being in its "1" state for passing any character timing signal applied to said first gate to the set terminal of said flip-flop.
means responsive to said second flip-flop being in its "1" state for enabling said output circuit,
means for supplying character timing signals and reset signals,
means responsive to said reset signals for resetting said first flip-flop,
and means responsive to said character timing signals and to said first flip-flop being in its "0" state for resetting said second flip-flop.

11. In combination,
a bidirectional serial memory arrangement comprising a propagation medium,
means for storing a data sequence in said medium,
control circuitry characterized by first and second control conditions,
and means coupled to said medium and responsive to said control circuitry being in its first condition for propagating a stored sequence in one direction along said medium in a relatively low speed digit-by-digit manner and responsive to said control circuitry being in its second condition for propagating a stored sequence in the other direction along said medium in a relatively high speed digit-by-digit manner.

12. A combination as in claim 11 further including at least one erasing coil coupled to said medium,
and means responsive to said control circuitry being in its second condition for applying an erasing signal to said coil(s).

13. In combination, a serial memory arrangement comprising a propagation medium having input and output ends, means coupled to said medium adjacent said input end for applying a multidigit data sequence thereto, means coupled to said medium adjacent said output end for abstracting digital signals therefrom, a normally-disabled circuit, means connecting said abstracting means to said circuit, means for propagating said sequence along said medium, and means coupled to said medium intermediate and spaced from said applying and abstracting means for detecting the propagation of said sequence and for enabling said circuit just prior to the appearance at said abstracting means of the first digit of said sequence.

References Cited

UNITED STATES PATENTS

| | | | |
|---|---|---|---|
| 3,328,763 | 6/1967 | Rathbun et al. | 340—172.5 |
| 3,307,150 | 2/1967 | Bartlett | 340—172.5 |
| 3,302,176 | 1/1967 | McLaughlin | 340—172.5 |
| 3,293,616 | 12/1966 | Mullery et al. | 340—172.5 |
| 3,271,741 | 9/1966 | Bates | 340—172.5 |
| 3,251,042 | 5/1966 | King | 340—172.5 |
| 3,241,122 | 3/1966 | Bardell | 340—172.5 |
| 3,226,693 | 12/1965 | Dumey | 340—172.5 |
| 3,191,155 | 6/1965 | Seeber et al. | 340—172.5 |
| 3,160,857 | 12/1964 | Frush | 340—172.5 |
| 3,159,810 | 12/1964 | Fire | 340—146.1 |
| 3,047,228 | 7/1962 | Bauer et al. | 235—157 |
| 2,770,797 | 11/1956 | Hamilton et al. | 340—174 |

PAUL J. HENON, *Primary Examiner.*

G. D. SHAW, *Assistant Examiner.*